US010626532B2

(12) United States Patent
Kamihira et al.

(10) Patent No.: US 10,626,532 B2
(45) Date of Patent: Apr. 21, 2020

(54) NON-TRANSITORY COMPUTER-READABLE MEDIUM STORING SEWING DATA GENERATION PROGRAM, SEWING DATA GENERATION DEVICE AND SEWING METHOD

(71) Applicant: BROTHER KOGYO KABUSHIKI KAISHA, Nagoya-shi, Aichi-ken (JP)

(72) Inventors: Yuta Kamihira, Nagoya (JP); Kazutaka Imaizumi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 144 days.

(21) Appl. No.: 16/012,257

(22) Filed: Jun. 19, 2018

(65) Prior Publication Data

US 2018/0298535 A1 Oct. 18, 2018

Related U.S. Application Data

(63) Continuation of application No. PCT/JP2016/084241, filed on Nov. 18, 2016.

(30) Foreign Application Priority Data

Dec. 25, 2015 (JP) ................................. 2015-254640

(51) Int. Cl.
*D05B 19/08* (2006.01)
*D05C 5/06* (2006.01)
(Continued)

(52) U.S. Cl.
CPC ............. *D05B 19/08* (2013.01); *D05B 3/243* (2013.01); *D05B 19/16* (2013.01); *D05C 5/06* (2013.01);
(Continued)

(58) Field of Classification Search
CPC ....... D05B 19/08; D05B 19/02; G06K 9/2063
See application file for complete search history.

(56) References Cited

U.S. PATENT DOCUMENTS 5,553,559 A * 9/1996 Inoue ..................... D05B 19/08
112/102.5
5,855,176 A 1/1999 Takenoya et al.
(Continued)

FOREIGN PATENT DOCUMENTS

JP  H11-164974 A  6/1999
JP  2000-24350 A  1/2000
(Continued)

OTHER PUBLICATIONS

Feb. 14, 2017 International Search Report issued in International Patent Application PCT/JP2016/084241.
(Continued)

*Primary Examiner* — Tajash D Patel
(74) *Attorney, Agent, or Firm* — Oliff PLC

(57) ABSTRACT

A non-transitory computer-readable medium stores computer-readable instructions for sewing data generation. The computer-readable instructions are executed by a processor provided in a sewing data generation device. When executed by the processor in the sewing data generation device, the computer-readable instructions instruct the processor to perform following processes. First, the processor acquires a pattern. And, the processor divides the acquired pattern into a first pattern and a second pattern. The second pattern includes an overlapping portion. The overlapping portion in the second pattern partially overlaps with the first pattern. The processor generates sewing data to sew each of the first pattern and the second pattern on a sewing object. And, the processor generates processing data to process, in full size, a processing pattern. The processing pattern is obtained by
(Continued)

excluding the overlapping portion from the second pattern, on a sheet-like processing object different from the sewing object.

12 Claims, 11 Drawing Sheets

(51) Int. Cl.
    *G06K 9/32*     (2006.01)
    *D05B 3/24*     (2006.01)
    *D05B 19/16*     (2006.01)
    *D05C 13/02*     (2006.01)
    *G06K 9/03*     (2006.01)

(52) U.S. Cl.
    CPC ............. *D05C 13/02* (2013.01); *G06K 9/036* (2013.01); *G06K 9/3216* (2013.01); *D05D 2305/36* (2013.01)

(56) References Cited

U.S. PATENT DOCUMENTS

| | | | |
|---|---|---|---|
| 9,938,650 B2 * | 4/2018 | Kongo | ............... D05B 19/02 |
| 2005/0234584 A1 | 10/2005 | Mizuno et al. | |
| 2010/0242817 A1 | 9/2010 | Tokura | |
| 2014/0000498 A1 * | 1/2014 | Yamanashi | ............ D05B 19/12 |
| | | | 112/102.5 |
| 2014/0182463 A1 | 7/2014 | Muto | |

FOREIGN PATENT DOCUMENTS

| | | |
|---|---|---|
| JP | 2005-279068 A | 10/2005 |
| JP | 2010-246885 A | 11/2010 |
| JP | 2014-124748 A | 7/2014 |

OTHER PUBLICATIONS

Jun. 26, 2018 International Preliminary Report on Patentability issued in International Patent Application PCT/JP2016/084241.

* cited by examiner

NON-TRANSITORY COMPUTER-READABLE MEDIUM STORING SEWING DATA GENERATION PROGRAM, SEWING DATA GENERATION DEVICE AND SEWING METHOD

CROSS-REFERENCE TO RELATED APPLICATION

This application is a Continuation Application of International Application No. PCT/JP2016/084241, filed Nov. 18, 2016, which claims priority from Japanese Patent Application No. 2015-254640, filed on Dec. 25, 2015. This disclosure of the foregoing application is hereby incorporated by reference in its entirety.

BACKGROUND

The present disclosure relates to a non-transitory computer-readable medium storing sewing data generation program that generates sewing data to sew a pattern using an embroidery sewing machine, to a sewing data generation device and to a sewing method.

A sewing machine capable of embroidery sewing normally uses an embroidery frame that holds a sewing object, and performs embroidery sewing within a sewable area that is set inside the embroidery frame in accordance with a type of the embroidery frame. In related art, a sewing machine is known that divides an embroidery pattern larger than the sewable area into a plurality of partial patterns smaller than the sewable area, and stores sewing data corresponding to the plurality of partial patterns. The sewing machine sequentially sews the plurality of partial patterns in accordance with the sewing data, and thus sews the embroidery pattern larger than the sewable area. Every time one partial pattern of the plurality of partial patterns is sewn, a user changes a holding position of a work cloth, which is the sewing object, with respect to the embroidery frame. The above-described sewing machine includes an image capture portion, and before and after the holding position of the work cloth by the embroidery frame is changed, captures images of markers disposed on a surface of the work cloth. The sewing machine extracts a plurality of feature points from the images of the markers, and performs positioning between the plurality of partial patterns on the basis of each of the extracted plurality of feature points.

In an operation in which the above-described markers are arranged, in accordance with the already sewn partial pattern, at sewing positions of the other partial patterns, a specific layout of the partial pattern to be sewn next cannot be imaged.

It is an object of the present disclosure to provide a non-transitory computer-readable medium storing a sewing data generation program, a sewing data generation device and a sewing method that make it possible to image a specific layout of a partial pattern to be sewn next when an embroidery pattern larger than a sewable area is sewn by being divided into a plurality of patterns smaller than the sewable area.

Various embodiments herein provide a non-transitory computer-readable medium storing computer-readable instructions for sewing data generation that are executed by a processor provided in a sewing data generation device. When executed by the processor, the computer-readable instructions instruct the processor to perform processes. The processes include acquiring a pattern and dividing the acquired pattern into a first pattern and a second pattern. The second pattern includes an overlapping portion that partially overlaps with the first pattern. The processes further include generating sewing data to sew each of the first pattern and the second pattern on a sewing object and generating processing data to process, in full size, a processing pattern obtained by excluding the overlapping portion from the second pattern, on a sheet-like processing object different from the sewing object.

Various embodiments also provide a sewing data generation device including a processor and a memory. The memory stores computer-readable instructions. When executed by the processor, the computer-readable instructions instruct the processor to perform processes. The processes include acquiring a pattern and dividing the acquired pattern into a first pattern and a second pattern. The second pattern includes an overlapping portion that partially overlaps with the first pattern. The processes further include generating sewing data to sew each of the first pattern and the second pattern on a sewing object and generating processing data to process, in full size, a processing pattern obtained by excluding the overlapping portion from the second pattern, on a sheet-like processing object different from the sewing object.

Various embodiments also provide a sewing method including dividing a pattern into a first pattern and a second pattern. The method further includes generating sewing data to sew each of the first pattern and the second pattern on a sewing object and sewing the first pattern on the sewing object in accordance with the generated sewing data. The method further includes generating print data to print the second pattern in full size on a print medium different from the sewing object and printing the second pattern in full size on the print medium in accordance with the generated print data. The method further includes arranging the print medium on which the second pattern has been printed, on the sewing object on which the first pattern has been sewn and adjusting a layout of the second pattern with respect to the first pattern sewn on the sewing object. The method further includes acquiring image data by capturing an image of the sewing object and the print medium in a state in which the print medium is arranged on the sewing object and correcting the sewing data to sew the second pattern, on the basis of the acquired image data. The method further includes sewing the second pattern on the sewing object on which the first pattern has been sewn in accordance with the corrected sewing data.

BRIEF DESCRIPTION OF THE DRAWINGS

Embodiments of the disclosure will be described below in detail with reference to the accompanying drawings in which.

DETAILED DESCRIPTION OF EMBODIMENTS

Figure 1:
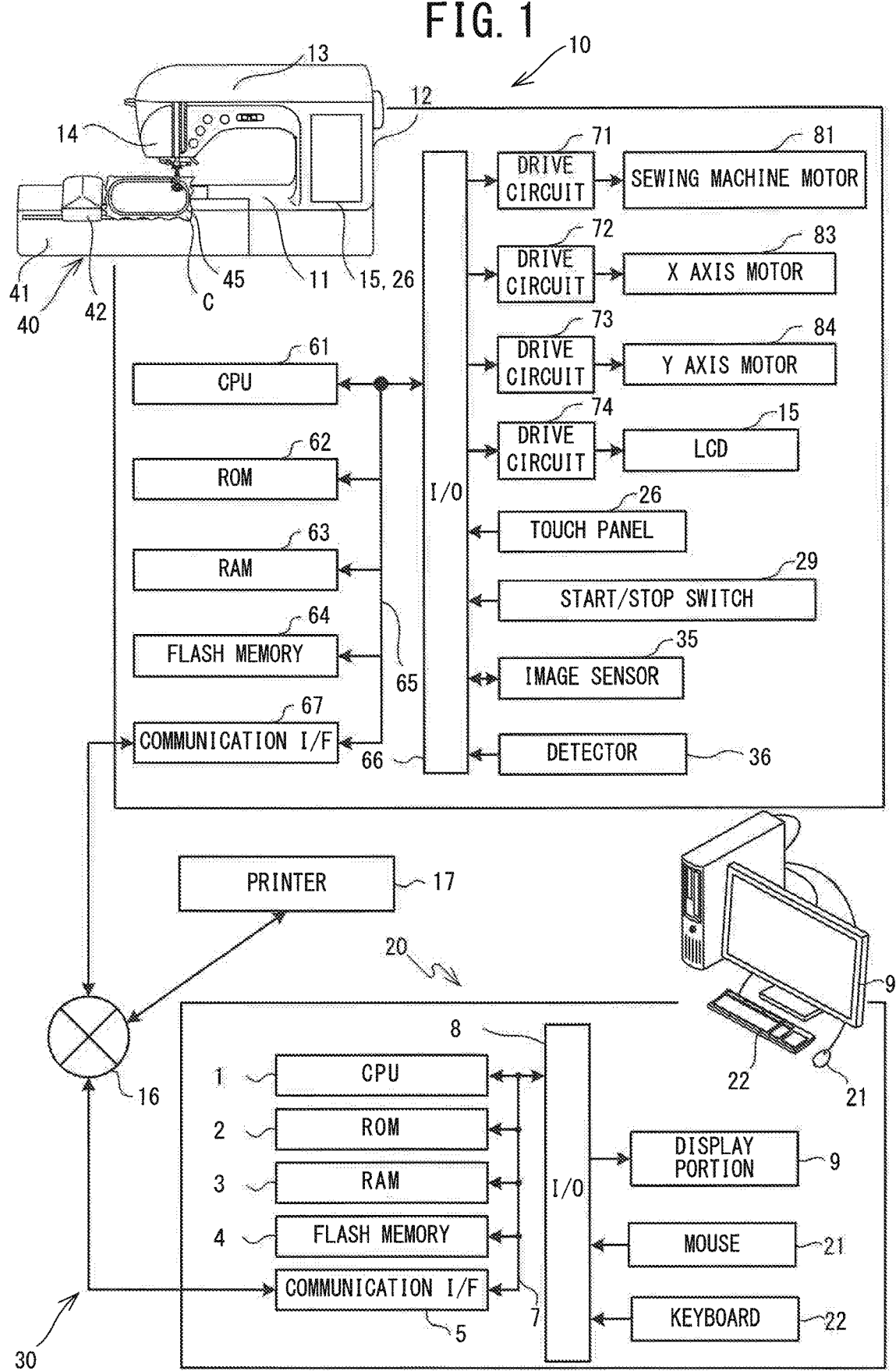
FIG. 1 is a schematic diagram of a sewing system 30 including a sewing machine 10, a printer 17 and a sewing data generation device 20.

An embodiment of the present disclosure will be explained with reference to the drawings. In the present specification, image data to be processed by a computer is also simply referred to as an "image." As shown in FIG. 1, a sewing system 30 is provided with a sewing machine 10, a printer 17 and a sewing data generation device 20 (hereinafter referred to as the "device 20"). The sewing machine 10 is capable of embroidery sewing. The printer 17 performs printing in accordance with print data that is received via a network 16. The device 20 is a well-known personal computer (PC), and is provided with a display portion 9, a mouse 21 and a keyboard 22.

1. Physical Configurations of Sewing Machine 10 and Embroidery Frame 45

As shown in FIG. 1, the sewing machine 10 is provided with a bed portion 11, a pillar 12, an arm portion 13, a head portion 14, a movement mechanism 40 and an image sensor 35. The bed portion 11 is a base portion of the sewing machine 10 and extends in the left-right direction. The pillar 12 is provided so as to extend upward from the right end portion of the bed portion 11. An LCD 15 and a touch panel 26 are provided on the front surface of the pillar 12. The arm portion 13 faces the bed portion 11 and extends to the left from the upper end of the pillar 12. The head portion 14 is a portion coupled to the left leading end portion of the arm portion 13. Although not shown in the drawings, the head portion 14 is provided with a needle bar, a presser bar, a needle bar up-and-down movement mechanism and the like. A sewing needle is detachably mounted on the lower end of the needle bar.

The movement mechanism 40 is configured such that it can relatively move a sewing object C (an object to be photographed), which is held by the embroidery frame 45, with respect to the needle bar and the image sensor 35 (to be described later). The movement mechanism 40 is provided with a main body case 41 and a carriage 42. When embroidery sewing is performed, a user mounts the embroidery frame 45 on the carriage 42. The embroidery frame 45 is moved to a needle drop point indicated by an XY coordinate system (an embroidery coordinate system) specific to the sewing machine 10, by a Y direction movement mechanism (not shown in the drawings) housed in the carriage 42 and an X direction movement mechanism (not shown in the drawings) housed in the main body case 41. The needle bar on which the sewing needle has been mounted and a shuttle mechanism (not shown in the drawings) are driven in accordance with the movement of the embroidery frame 45. Thus, an embroidery pattern is sewn on the sewing object C.

The image sensor 35 has a predetermined image capture range and is provided inside the head portion 14. The image sensor 35 is, for example, a well-known complementary metal oxide semiconductor (CMOS) image sensor. A coordinate system of an image (hereinafter also referred to as an "image coordinate system") represented by the image data generated by the image sensor 35 and a coordinate system of a whole space (hereinafter also referred to as a "world coordinate system") are associated with each other in advance using parameters stored in a flash memory 64. Since the world coordinate system and the embroidery coordinate system are associated with each other in advance using the parameters stored in the flash memory 64, the sewing machine 10 can identify coordinates of the embroidery coordinate system on the basis of the image data generated by the image sensor 35.

2. Electrical Configuration of Sewing Machine 10

Electrical configurations of the sewing machine 10 and the device 20 of the sewing system 30 will be explained sequentially with reference to FIG. 1. The sewing machine 10 is provided with a CPU 61, a ROM 62, a RAM 63, the flash memory 64, an input/output (I/O) interface 66 and a communication I/F 67. The CPU 61 is connected to the ROM 62, the RAM 63, the flash memory 64, the I/O interface 66 and the communication I/F 67, via a bus 65. Drive circuits 71 to 74, the touch panel 26, a start/stop switch 29, the image sensor 35 and a detector 36 are connected to the I/O interface 66. The detector 36 is configured to detect that the embroidery frame 45 has been mounted on the movement mechanism 40, and to output a detection result corresponding to a type of the embroidery frame 45.

A sewing machine motor 81 is connected to the drive circuit 71. The drive circuit 71 drives the sewing machine motor 81 in accordance with a control signal from the CPU 61. When the sewing machine motor 81 is driven, the needle bar up-and-down movement mechanism (not shown in the drawings) is driven via a drive shaft (not shown in the drawings) of the sewing machine 10, and the needle bar moves up and down. An X axis motor 83 is connected to the drive circuit 72. A Y axis motor 84 is connected to the drive circuit 73. The drive circuits 72 and 73 drive the X axis motor 83 and the Y axis motor 84, respectively, in accordance with a control signal from the CPU 61. When the X axis motor 83 and the Y axis motor 84 are driven, the embroidery frame 45 mounted on the movement mechanism 40 moves in the left-right direction (an X axis direction) and the front-rear direction (a Y axis direction) by a movement amount corresponding to the control signal. The drive circuit 74 causes an image to be displayed on the LCD 15 in accordance with a control signal from the CPU 61. The communication I/F 67 connects the sewing machine 10 to the network 16. The CPU 61 can transmit and receive data to and from another device (for example, the device 20) connected to the network 16, via the communication I/F 67.

Operations of the sewing machine 10 will be explained briefly. When the embroidery sewing is performed using the embroidery frame 45, the needle bar up-and-down movement mechanism and the shuttle mechanism are driven in conjunction with the embroidery frame 45 being moved in the X axis direction and the Y axis direction by the movement mechanism 40. Thus, an embroidery pattern is sewn on the sewing object C held by the embroidery frame 45, using the sewing needle mounted on the needle bar.

3. Electrical Configuration of Device 20

As shown in FIG. 1, the device 20 is provided with a CPU 1, a ROM 2, a RAM 3, a flash memory 4, a communication I/F 5 and an input/output interface 8. The CPU 1 performs overall control of the device 20. The CPU 1 is electrically connected to the ROM 2, the RAM 3, the flash memory 4, the communication I/F 5 and the input/output interface 8, via a bus 7. A boot program and a BIOS and the like are stored in the ROM 2. Temporary data is stored in the RAM 3. The flash memory 4 stores various setting values. The communication I/F 5 is an interface to connect the device 20 to the network 16. The CPU 1 can transmit and receive data to and from other devices (for example, the sewing machine 10 and the printer 17) connected to the network 16, via the communication I/F 5. The input/output interface 8 is connected to the display portion 9, the mouse 21 and the keyboard 22. The display portion 9 is a liquid crystal display. The mouse 21 and the keyboard 22 are used to input various commands.

4. Storage Areas of Flash Memory 4

Figure 2:
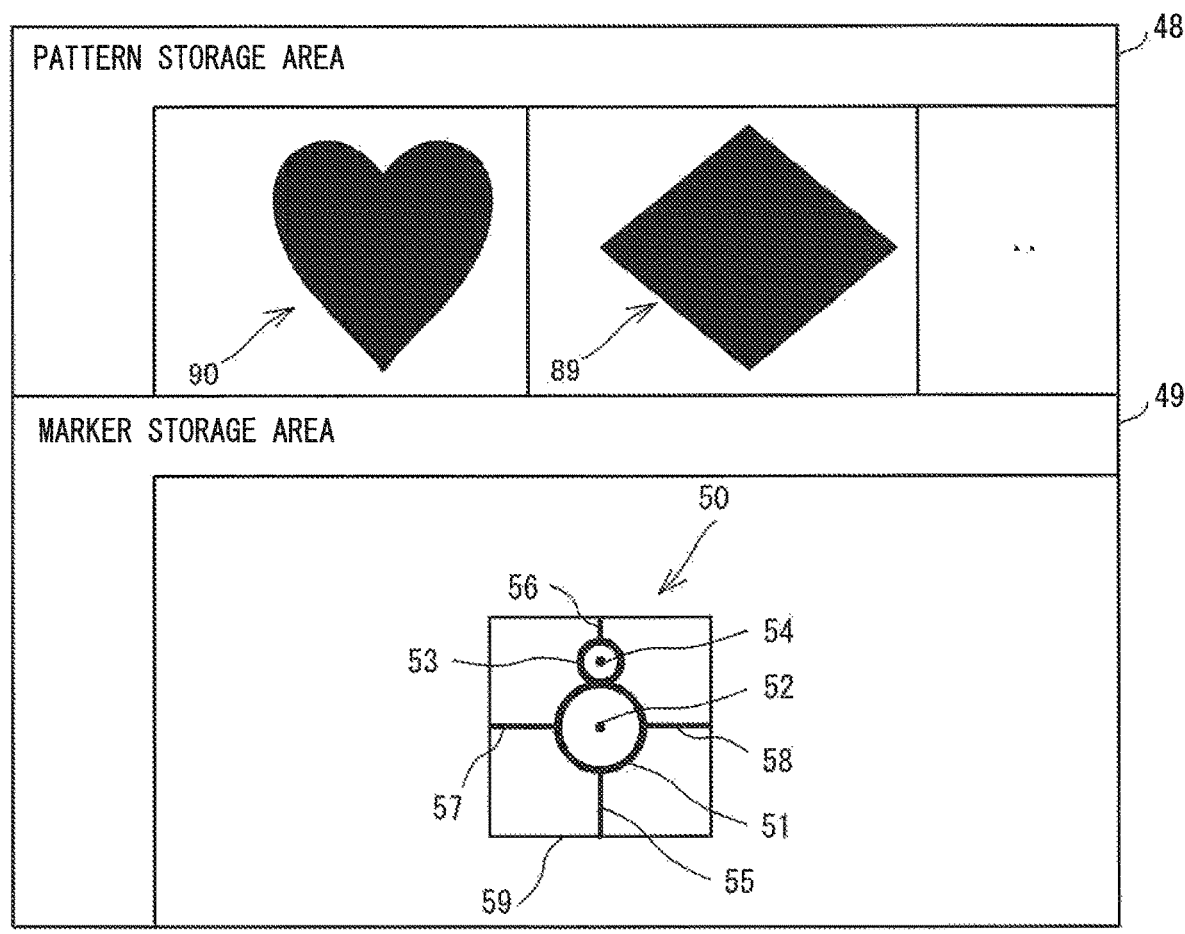
FIG. 2 is an explanatory diagram of a pattern storage area 48 and a marker storage area 49.

A pattern storage area 48 and the marker storage area 49 provided in the flash memory 4 of the device 20 will be explained with reference to FIG. 2. The pattern storage area 48 stores pattern data corresponding to each of a plurality of patterns that become candidates for the pattern to be sewn by the sewing machine 10. The plurality of patterns are, for example, a heart-shaped pattern 90 and a diamond-shaped pattern 89. The pattern data includes sewing data. The sewing data indicates coordinates of needle drop points to form stitches of the pattern, a sewing order, and a color of a thread to be used. The marker storage area 49 stores data representing a marker used when sewing data generation processing is performed by the sewing system 30. An image of the marker is captured by the sewing machine 10, and the marker includes a pattern (a graphic, a symbol or the like) whose layout (a position and an angle) can be detected from the acquired image. In the device 20, the data representing the marker is used in processing that generates processing data representing the marker. Although not shown in the drawings, the data representing the marker is also stored in the flash memory 64 of the sewing machine 10. In the sewing machine 10, the data representing the marker is used in processing that extracts the marker from the image acquired by the image sensor 35. The data representing the marker is, for example, image data representing the marker.

A marker 50 of the present example includes a line drawing that is depicted using a black color in a white area surrounded by a contour 59. The contour 59 of the marker 50 has a square shape, each of whose sides is about 2.5 cm, for example. The line drawing includes a circle 51, a point 52 that is the center of the circle 51, a circle 53, a point 54 that is the center of the circle 53, and line segments 55, 56, 57 and 58. The circle 51 is depicted such that the point 52 is a central point of the marker 50. The circle 53 is in contact with the circle 51, and is depicted in a position where a virtual straight line (not shown in the drawings) that passes through the point 52 and the point 54 is parallel to one side of the contour 59. The diameter of the circle 53 is smaller than the diameter of the circle 51. The line segment 55 and the line segment 56 overlap with the virtual straight line (not shown in the drawings) that passes through the point 52 and the point 54, and extend respectively from the circle 51 and the circle 53 to the contour 59. The line segment 57 and the line segment 58 overlap with a virtual straight line (not shown in the drawings) that passes through the point 52 of the circle 51 and that is orthogonal to the line segment 55. The line segment 57 and the line segment 58 extend from the outer edge of the circle 51 to the contour 59 of the marker 50.

5. Outline of Processing Performed by Sewing System 30

An outline of the sewing data generation processing that can be performed by the sewing system 30 will be explained. In the sewing system 30, the device 20 can generate the sewing data of the pattern to be sewn by the sewing machine 10. When the pattern to be sewn is selected by the user, the device 20 of the present example divides the selected pattern into a first pattern and a second pattern including an overlapping portion that partially overlaps with the first pattern, in accordance with a size of the selected pattern. The device 20 generates the sewing data to sew each of the first pattern and the second pattern on the sewing object C. The device 20 generates processing data to process in full size a processing pattern, which is obtained by excluding the overlapping portion from the second pattern, on a sheet-like processing object different from the sewing object C. The processing data of the present example is print data to print the processing pattern in full size on a print medium that is the sheet-like processing object. The sewing machine 10 can sew the pattern in accordance with the sewing data generated by the device 20. By aligning the processing pattern that has been processed on the processing object with the first pattern that has been sewn on the sewing object, the user can intuitively grasp the layout of the second pattern with respect to the first pattern. The sewing machine 10 can perform the positioning of the second pattern with respect to the first pattern using image data obtained by capturing an image of the processing object that has been processed based on the processing data.

6. Processing Performed by Device 20

Main processing of the device 20 will be explained with reference to FIG. 3 to FIG. 9. In the main processing of the device 20, processing is performed that generates sewing data to sew the pattern selected by the user and print data to print the processing pattern (a printing pattern). After the user inputs commands relating to the pattern to be sewn, the type of the embroidery frame to be used, and the type of the print medium to be used for the printing of the processing pattern, the main processing is performed when the user operates the device 20 and inputs a command to activate an application to perform the main processing. The pattern to be sewn is selected from among, for example, the plurality of patterns stored in the pattern storage area 48 of the flash memory 4. When the CPU 1 of the device 20 detects the command to activate the application, the CPU 1 reads out, to the RAM 3, a sewing data generation program to perform the main processing stored in a program storage area of the ROM 2. In accordance with instructions included in the sewing data generation program read out to the RAM 3, the CPU 1 performs the following steps. Various parameters that are necessary to perform the main processing are stored in the flash memory 4. Various data obtained in the course of the main processing are stored in the RAM 3 as appropriate. Hereinafter, an explanation will be given for a case in which the heart-shaped pattern 90 in FIG. 4 is selected, as the pattern to be sewn, from among the plurality of patterns stored in the pattern storage area 48 of the flash memory 4. The pattern data of the selected pattern includes the sewing data to perform sewing using a predetermined stitch (for example, a fill stitch with a predetermined thread density). The predetermined stitch may be selectable by the user.

Figure 3:
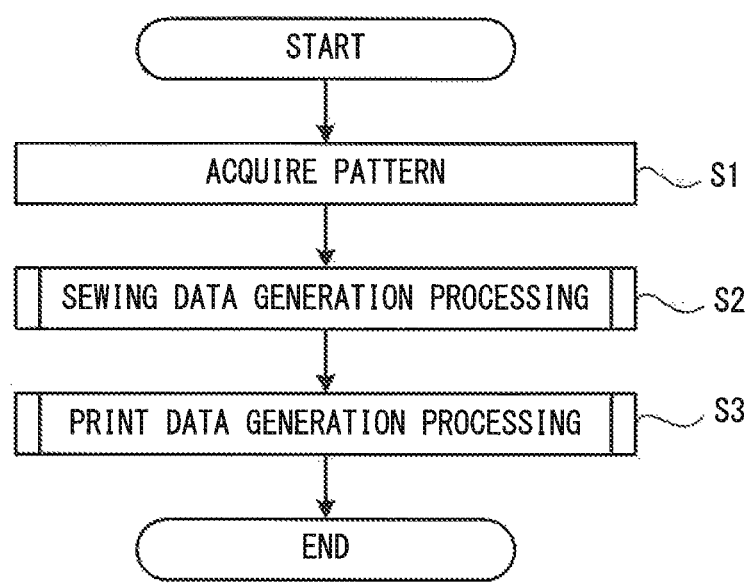
FIG. 3 is a flowchart of main processing that is performed by the sewing data generation device 20.
Figure 4:
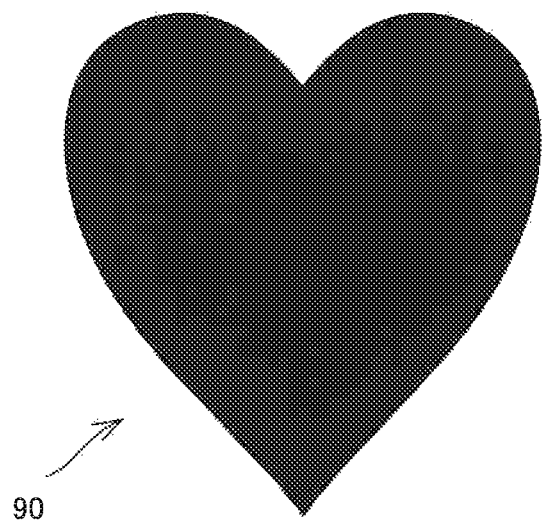
FIG. 4 is an outline drawing of a heart-shaped pattern 90.
Figure 5:
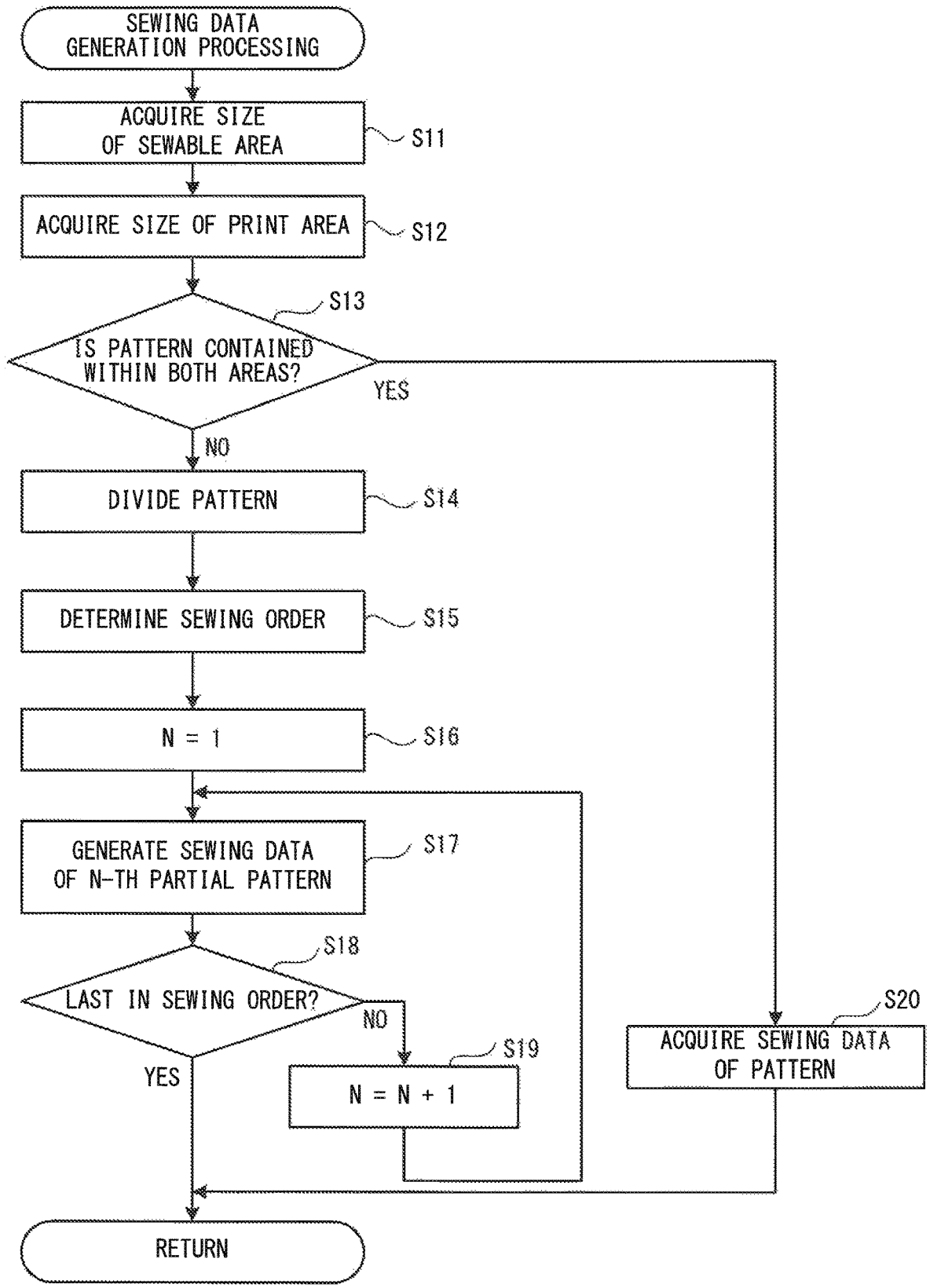
FIG. 5 is a flowchart of sewing data generation processing that is performed in the main processing shown in FIG. 3.

As shown in FIG. 3, the CPU 1 acquires the heart-shaped pattern 90 selected by the user from the pattern storage area 48 (step S1). The pattern 90 is a pattern formed such that the inside of the heart-shaped contour is sewn using a red thread and using the full stitch with the predetermined thread density. The CPU 1 performs the sewing data generation processing that generates the sewing data to sew the pattern acquired at step S1 (step S2). As shown in FIG. 5, in the sewing data generation processing, the CPU 1 acquires the size of a sewable area on the basis of the type of the embroidery frame to be used specified at the start of the main processing (step S11). The sewable area of the present example is a rectangular area that is set inside the embroidery frame. A relationship between the type of the embroidery frame and the size of the sewable area is stored in advance in the flash memory 4. The relationship between the type of the embroidery frame and the size of the sewable area may be set by the user. Instead of the type of the embroidery frame, the size of the sewable area may be specified when the main processing is activated. In this case, the specified size of the sewable area is acquired at step S11. In the present example, the size of a sewable area 46 (refer to FIG. 6) corresponding to the embroidery frame 45 is acquired.

Figure 6:
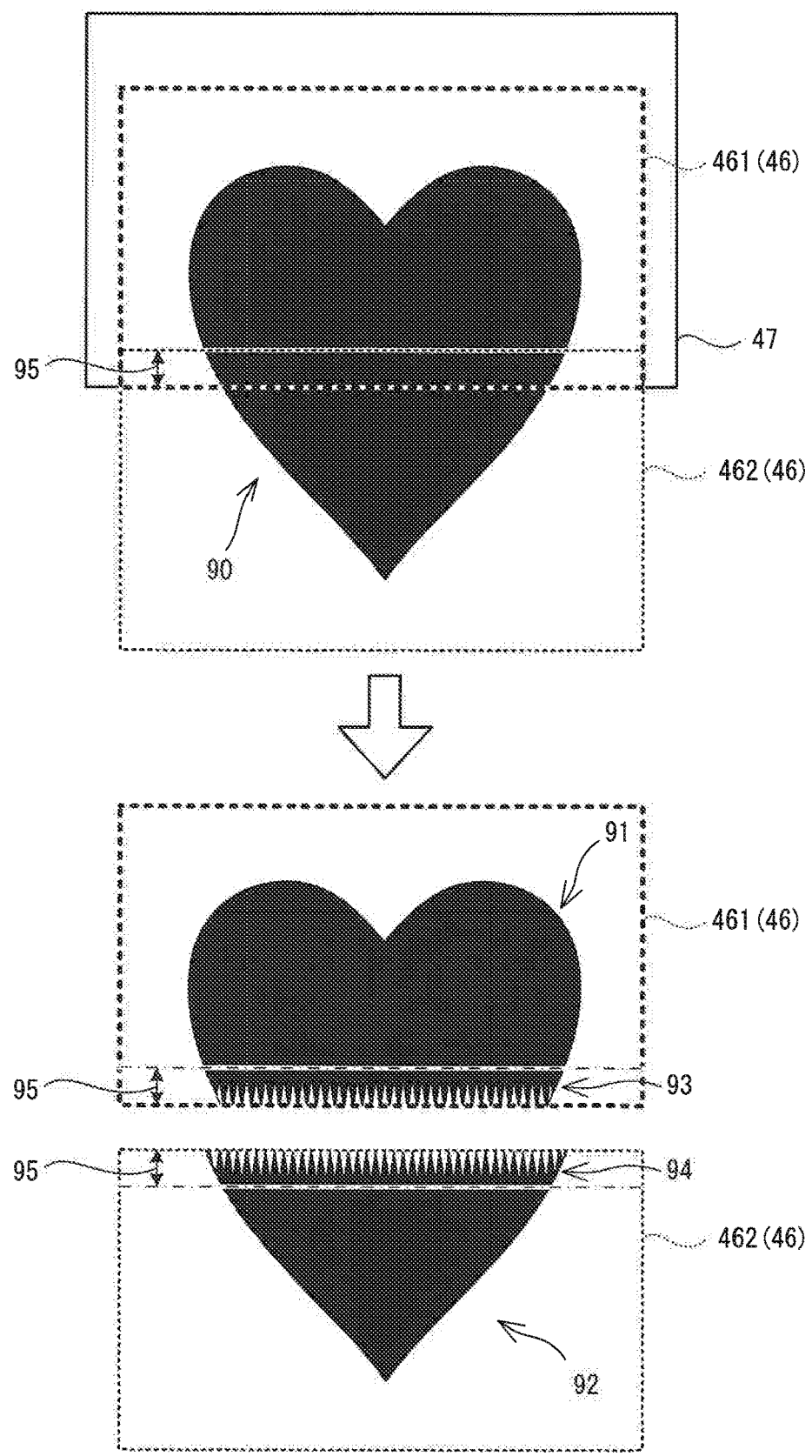
FIG. 6 is an explanatory diagram of processing that divides the pattern 90 into a first pattern 91 and a second pattern 92 in accordance with a sewable area 46.

The CPU 1 acquires the size of a print area on the basis of the type of the print medium (step S12). A relationship between the type of the print medium and the size of the print area is stored in advance in the flash memory 4. The relationship between the type of the print medium and the size of the print area may be set by the user. Instead of the type of the print medium, the size of the print area may be specified when the main processing is activated. In this case, the specified size of the print area is acquired at step S12. In the present example, the print area corresponding to an A4 size print medium that is supplied to the printer 17 is acquired. In the present example, in order to simplify the explanation, the explanation will be given for a case in which a margin is not set for the print medium and the size of the print medium matches the size of the print area. In the present example, as shown in FIG. 6, the sewable area 46 is contained within a print area 47.

The CPU 1 determines whether or not the pattern acquired at step S1 is contained within both the sewable area and the print area (step S13). In the present example, the sewable area 46 is contained within the print area 47. Therefore, when the pattern 90 is contained within the sewable area 46, it is determined that the pattern 90 is contained within both the sewable area 46 and the print area 47. When the pattern is contained within both the sewable area 46 and the print area 47 (yes at step S13), the CPU 1 acquires the sewing data of the pattern acquired at step S1 from the pattern storage area 48 (step S20). The CPU 1 ends the sewing data generation processing and returns the processing to the main processing in FIG. 3.

The pattern 90 of the present example is not contained within the sewable area 46 of the embroidery frame 45 (no at step S13). In this case, the CPU 1 divides the pattern into the first pattern and the second pattern including the overlapping portion that partially overlaps with the first pattern (step S14). As shown in FIG. 6, the CPU 1 divides the pattern 90 into a first pattern 91 and a second pattern 92 in accordance with a known method (for example, a method described in Japanese Laid-Open Patent Publication No. 2000-24350). The first pattern 91 is a pattern that is sewn when a holding position of the sewing object C with respect to the embroidery frame 45 is a first position. The second pattern 92 is a pattern that is sewn when the holding position of the sewing object C with respect to the embroidery frame 45 is a second position. As described below, the CPU 1 divides the pattern 90 into the first pattern 91 and the second pattern 92 on the basis of the size of the sewable area 46. The CPU 1 sets the first position and the second position such that a sewable area 461 when the holding position of the sewing object C with respect to the embroidery frame 45 is the first position and a sewable area 462 when the holding position is the second position overlap with each other by a predetermined amount. The predetermined amount may be set in advance and is shown by arrows 95 in the present example. The CPU 1 sets the overlapping portion, in which the first pattern 91 and the second pattern 92 partially overlap with each other, in a section of the pattern 90 inside a rectangular area in which the sewable area 461 and the sewable area 462 overlap with each other by the predetermined amount, and divides the pattern 90 into the first pattern 91 and the second pattern 92. The first pattern 91 is contained within the sewable area 461. The second pattern 92 is contained within the sewable area 462. The first pattern 91 includes an overlapping portion 93 that partially overlaps with the second pattern 92. The overlapping portion 93 is a section of the first pattern 91 that is within a rectangular range having a width shown by the arrows 95. Similarly, the second pattern 92 includes an overlapping portion 94 that partially overlaps with the first pattern 91. The overlapping portion 94 is a section of the second pattern 92 that is within the rectangular range having the width shown by the arrows 95.

The CPU 1 sets a sewing order for each of the partial patterns obtained by dividing the pattern at step S14 (step S15). For example, the CPU 1 sets the sewing order of the first pattern 91 to 1 and sets the sewing order of the second pattern 92 to 2. The CPU 1 sets a variable N, which is used to read out the partial patterns in accordance with the sewing order, to 1 (step S16). The CPU 1 generates the sewing data of the N-th partial pattern in the sewing order (step S17). The CPU 1 generates the sewing data of the N-th partial pattern in accordance with a known method (for example, a method described in Japanese Laid-Open Patent Publication No. 2000-24350). In the present example, when the variable N is 1, the sewing data is generated to sew the first pattern 91, which is the first pattern in the sewing order, using the red thread and using the full stitch with the predetermined thread density. The CPU 1 determines whether or not the variable N is the last in the sewing order (step S18). When the variable N is 1, it is determined that the variable N is not the last in the sewing order (no at step S18). In this case, the CPU 1 increments the variable N by 1 (step S19) and thereafter returns the processing to step S17. When the variable N is 2, the sewing data is generated to sew the second pattern 92, which is the second pattern in the sewing order, using the red thread and using the full stitch with the predetermined thread density. When the variable N is 2, it is determined that the variable N is the last in the sewing order (yes at step S18). In this case, the CPU 1 ends the sewing data generation processing and returns the processing to FIG. 3.

Figure 7:
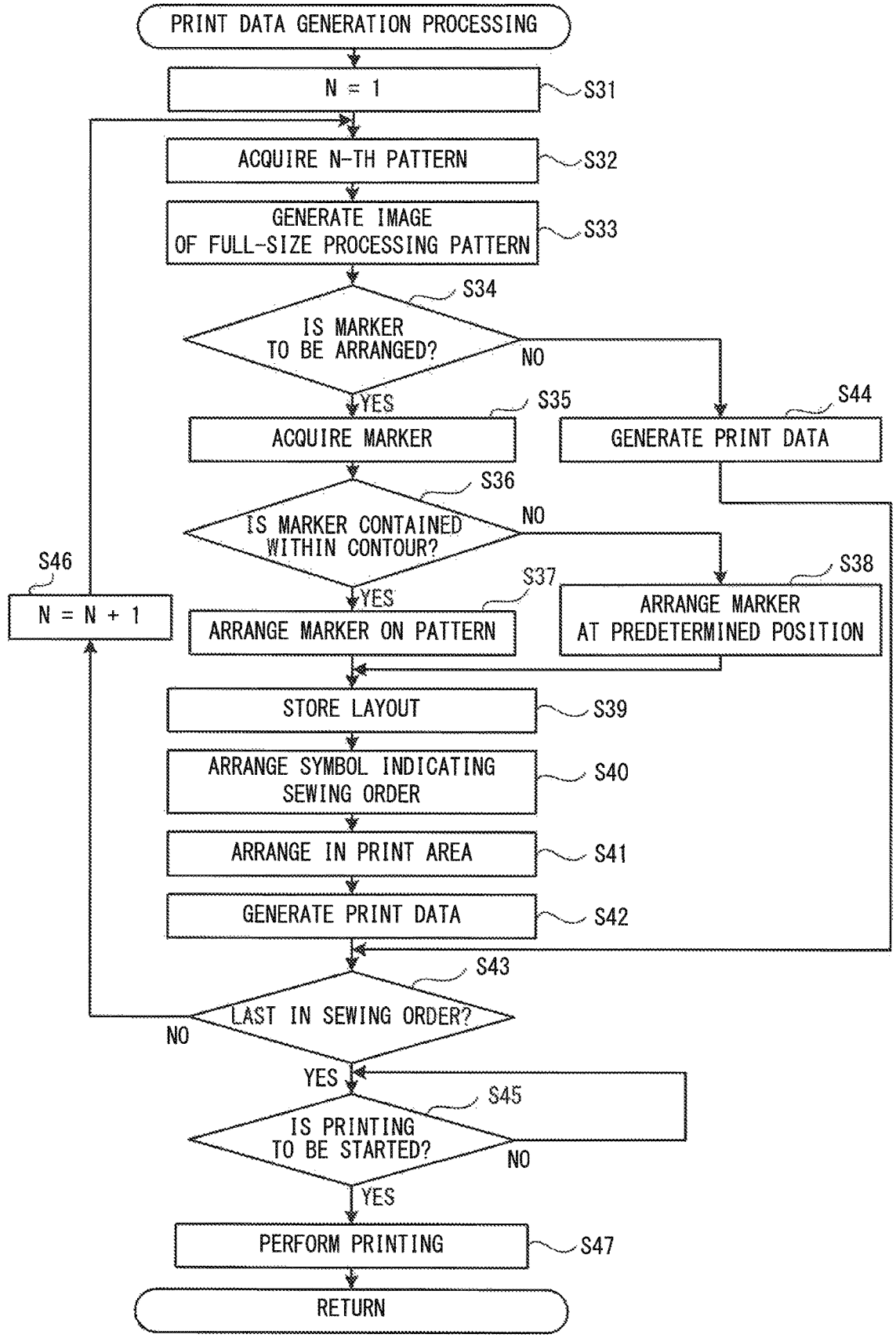
FIG. 7 is a flowchart of print data generation processing that is performed in the main processing shown in FIG. 3.
Figure 8:
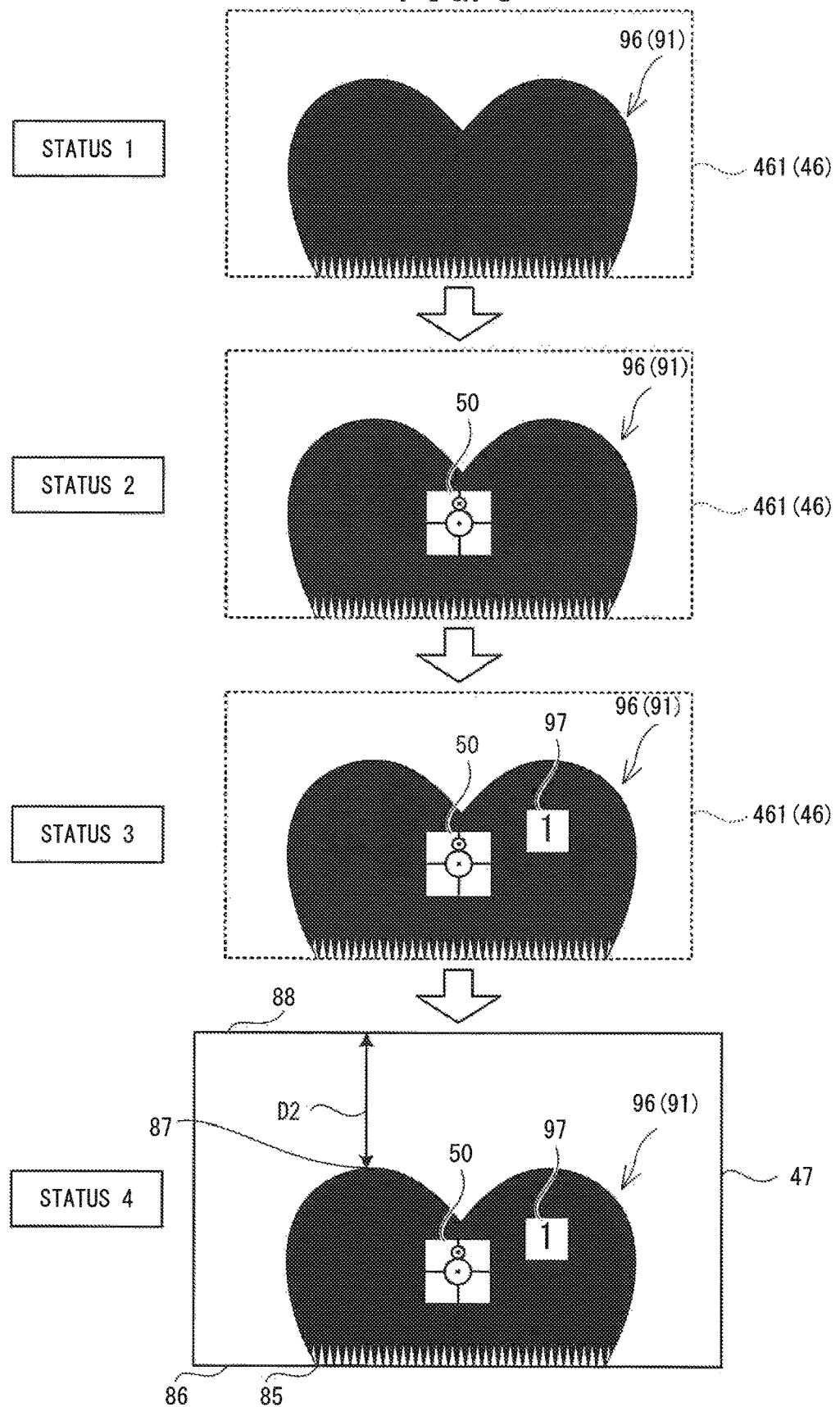
FIG. 8 is an explanatory diagram of a process to generate processing data used to process a processing pattern 96 of the first pattern 91.
Figure 9:
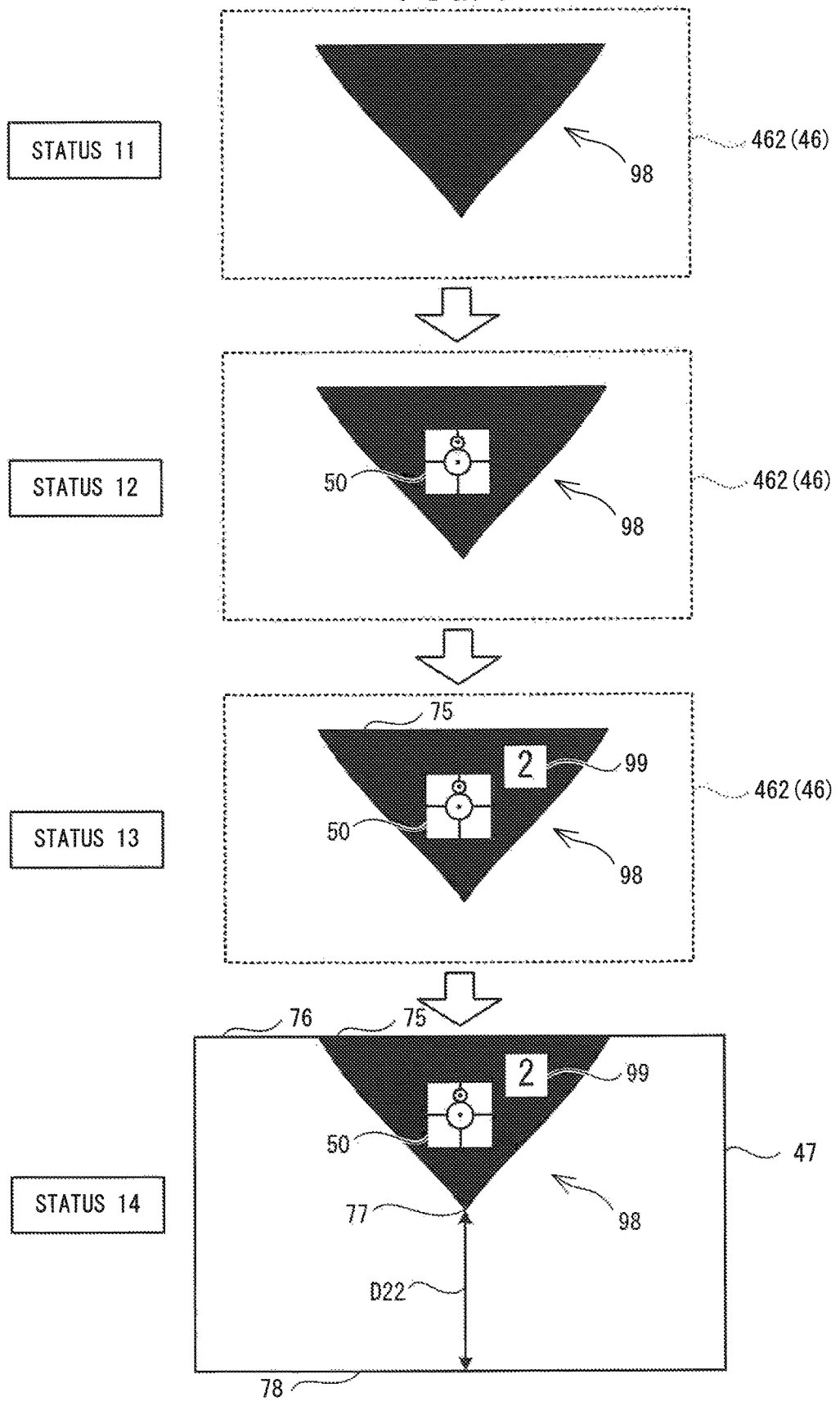
FIG. 9 is an explanatory diagram of a process to generate processing data used to process a processing pattern 98 of the second pattern 92.

As shown in FIG. 3, after the processing at step S2, the CPU 1 performs print data generation processing that generates the print data to print a full-size processing pattern (step S3). As shown in FIG. 7, the CPU 1 sets the variable N to 1 (step S31). The CPU 1 acquires the N-th pattern in the sewing order (step S32). When the pattern is not divided by the processing at step S2, the pattern acquired at step S1 is acquired at step S32. When the pattern is divided by the processing at step S2, the N-th partial pattern in the sewing order is acquired at step S32. The CPU 1 generates an image of the full-size processing pattern of the pattern acquired at step S32 (step S33). The processing pattern is a pattern excluding the overlapping portion that overlaps with the preceding partial pattern in the sewing order among the plurality of partial patterns. When the pattern is not divided by the processing at step S2, an image representing the pattern acquired at step S1 is generated at step S33. As shown by a status 1 in FIG. 8, a processing pattern 96 when the variable N is 1 matches the first pattern 91 that is the first pattern in the sewing order. Using a known method, the CPU 1 arranges the line segment representing the stitches on the image in accordance with coordinate data. Thus, on the basis of the sewing data, the CPU 1 generates the image representing the full-size processing pattern.

The CPU 1 determines whether or not to arrange the marker 50 on the processing pattern 96 (step S34). Whether or not to arrange the marker 50 on the processing pattern 96 may be specified by the user, for example, or may be set in advance. When the marker 50 is not to be arranged on the processing pattern 96 (no at step S34), the CPU 1 generates the print data to print the image generated at step S33 (step S44), and performs processing at step S43 to be described later.

When the marker 50 is to be arranged on the processing pattern 96 (yes at step S34), the CPU 1 acquires data representing the marker 50 from the marker storage area 49 of the flash memory 4 (step S35). The CPU 1 determines whether or not the marker 50 is contained within the contour of the processing pattern 96 generated at step S33 (step S36). When the marker 50 is contained within the contour of the processing pattern (no at step S36), the CPU 1 arranges the marker, with respect to the processing pattern, at a predetermined position where the marker does not overlap with the processing pattern (step S38). The predetermined position may be determined in advance and is, for example, a position that is in contact with a vertex in a predetermined direction (for example, the upper left) of a maximum rectangle in which the processing pattern is inscribed.

In the present example, the marker 50 is contained within the contour of the processing pattern 96 (yes at step S36). In this case, as shown by a status 2 in FIG. 8, the CPU 1 arranges the marker 50 acquired at step S34 on the processing pattern 96 generated at step S33 (step S37). Subsequent to the processing at step S37 or step S38, the CPU 1 stores the position of the processing pattern (the partial pattern) with respect to the marker set at step S37 or step S38, in association with the N-th pattern in the sewing order (step S39). In the present example, the position and angle of the processing pattern 96 (the first pattern 91) with respect to the marker 50 are stored, as layout data, in association with the sewing data of the first pattern 91. The layout data need not necessarily include the angle of the processing pattern (the partial pattern) with respect to the marker.

The CPU 1 arranges a symbol indicating N in the sewing order, on the image of the N-th processing pattern in the sewing order (step S40). In the present example, as shown by a status 3 in FIG. 8, a symbol 97, which indicates 1 in the sewing order, is arranged to the right of the marker 50. The CPU 1 arranges the image of the processing pattern 96, the marker 50 and the symbol 97 indicating the sewing order, in the print area 47 acquired at step S12 (step S41). Specifically, as shown by a status 4 in FIG. 8, the CPU 1 sets to 0 a distance D1 (not shown in the drawings) between a first end portion 85 that is on a first side (a lower side) of the processing pattern 96, i.e., on a side on which the overlapping portion 93 is present, and an end portion 86 on the first side of the rectangular print area 47. The distance D1 is shorter than a distance D2 between a second end portion 87 that is on a second side (an upper side) opposite to the lower side of the processing pattern 96, and an end portion 88 on the second side of the print area 47. In other words, the CPU 1 causes the end portion of the processing pattern 96 on the side on which the overlapping portion 93 is present to be placed alongside one end of the print area 47.

The CPU 1 generates the print data to print the image of the processing pattern 96, the marker 50 and the symbol 97 indicating the sewing order in accordance with the layout set at step S41 (step S42). The CPU 1 determines whether or not the variable N indicating the sewing order is the last in the sewing order (step S43). When the variable N is not the last in the sewing order (no at step S43), the CPU 1 increments the variable N by 1 and returns the processing to step S32.

When the variable N is 2, the CPU 1 acquires the second pattern 92 (step S32). As shown by a status 11 in FIG. 9, the CPU 1 generates an image of the full-size processing pattern 98 of the second pattern 92 acquired at step S32 (step S33). The processing pattern 98 is a pattern obtained by excluding the overlapping portion 94 from the second pattern 92. When the marker 50 is to be arranged on the processing pattern 98 (yes at step S34), the CPU 1 acquires the data indicating the marker 50 from the marker storage area 49 of the flash memory 4 (step S35). In the present example, the marker 50 is contained within the contour of the processing pattern 98 generated at step S33 (yes at step S36). In this case, as shown by a status 12 in FIG. 9, the CPU 1 arranges the marker 50 acquired at step S34 on the processing pattern 98 generated at step S33 (step S37). The CPU 1 stores, as the layout data, the position and angle of the processing pattern 98 (the second pattern 92) with respect to the marker 50, in association with the sewing data of the second pattern 92 (step S39).

The CPU 1 arranges a symbol 99, which indicates 2 in the sewing order, on the image of the processing pattern 98 (step S40). As shown by a status 13 in FIG. 9, the symbol 99, which indicates 2 in the sewing order, is arranged to the right of the marker 50. The CPU 1 arranges the image of the processing pattern 98, the marker 50 and the symbol 99 indicating the sewing order, in the print area 47 acquired at step S12 (step S41). Specifically, as showy by a status 14 in FIG. 9, the CPU 1 sets to 0 a distance D21 (not shown in the drawings) between a first end portion 75 that is on a first side (an upper side) of the processing pattern 98, i.e. on a side in contact with the overlapping portion 94, and an end portion 76 on the first side of the rectangular print area 47. The distance D21 is shorter than a distance D22 between a second end portion 77 that is on a second side (a lower side) opposite to the upper side of the processing pattern 98, and an end portion 78 on the second side of the print area 47. The CPU 1 generates the print data to print the image of the processing pattern 98, the marker 50 and the symbol 99 indicating the sewing order in accordance with the layout set at step S41 (step S42).

Since the variable N indicating the sewing order is 2, it is determined that the sewing order is the last in the sewing order (yes at step S43), and the CPU 1 determines whether or not a printing start command has been acquired (step S45). The CPU 1 stands by until the printing start command is acquired (no at step S45). The user operates the mouse 21 or the keyboard 22 to input the printing start command. When the printing start command has been acquired (yes at step S45), the CPU 1 outputs, to the printer 17, the print data generated by the processing at step S42 or step S44 and performs the printing (step S47). The CPU 1 ends the print data generation processing, returns the processing to step S3, and ends the main processing.

The main processing that is performed by the sewing machine 10 will be explained with reference to FIG. 10 and FIG. 11, using the above-described example. In the main processing, the processing is performed to sew the pattern in accordance with the sewing data generated by the device 20. The sewing data generated by the device 20 is transmitted to the sewing machine 10 via the network 16, for example. In the sewing system 30 of the present example, in addition to the sewing data, the layout data indicating the position and angle of the pattern with respect to the marker 50 is transmitted to the sewing machine 10. The sewing data and the layout data generated by the device 20 may be stored in a storage medium, such as a memory card, for example, and may be acquired by the sewing machine 10. The main processing is activated when the pattern of the sewing data generated by the device 20 is selected as the pattern to be sewn. When the CPU 61 detects a command to activate the main processing, the CPU 61 reads out, to the RAM 63, a program to execute the main processing stored in a program storage area of the ROM 62. In accordance with instructions included in the program read out to the RAM 63, the CPU 61 performs the following steps. Various parameters that are necessary to perform the main processing are stored in the flash memory 64. Various data obtained in the course of the main processing are stored in the RAM 63 as appropriate.

Figure 10:
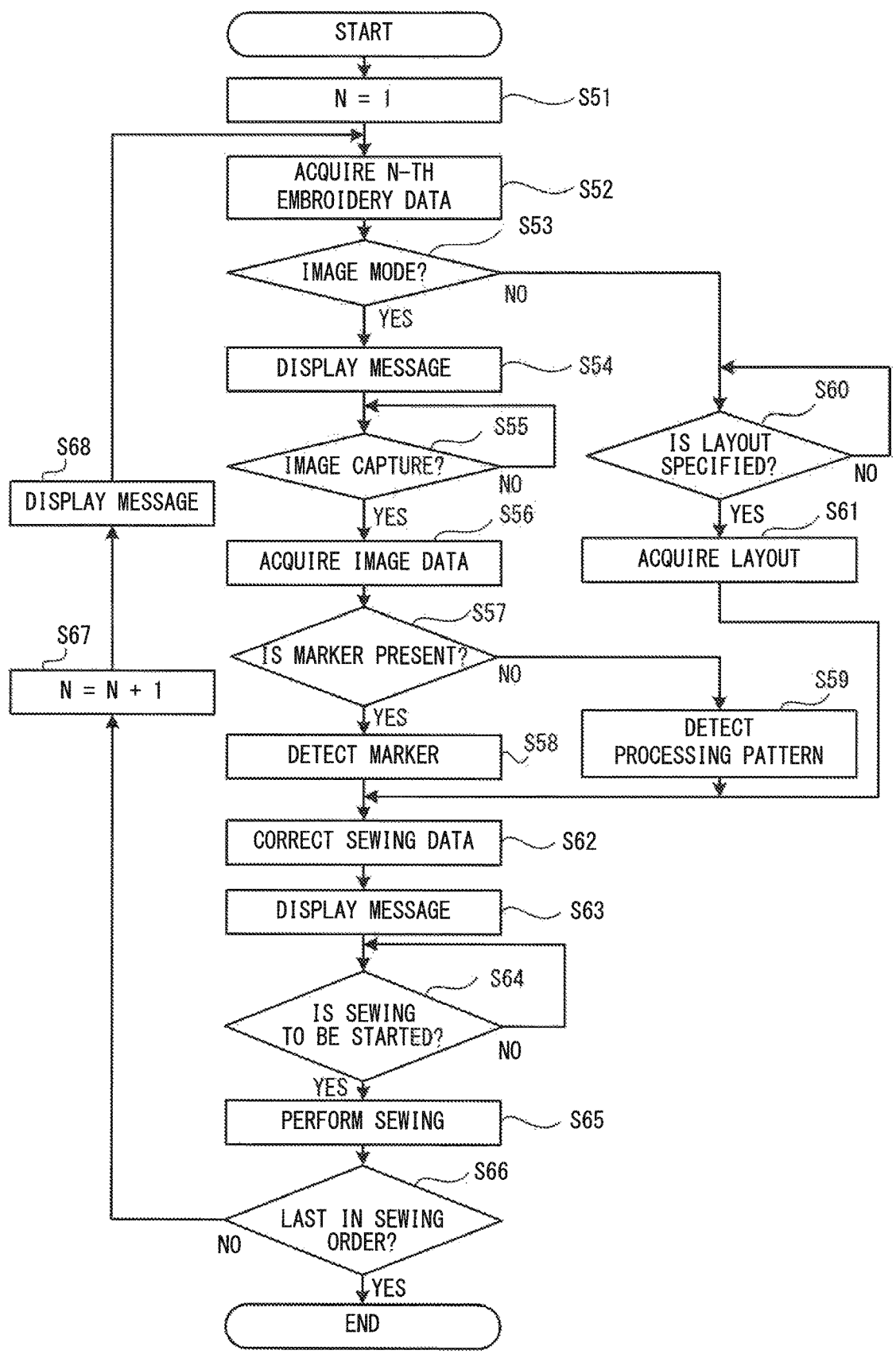
FIG. 10 is an explanatory diagram of main processing that is performed by the sewing machine 10.

As shown in FIG. 10, the CPU 61 sets the variable N to 1 (step S51). The CPU 61 acquires embroidery data to sew the N-th pattern in the sewing order (step S52). The embroidery data includes the sewing data and the layout data. The embroidery data may include the image data representing the pattern. The CPU 61 determines whether or not the mode is an image mode (step 53). The image mode is a mode in which the positioning of the pattern is performed on the basis of the image captured by the image sensor 35.

When the mode is not the image mode (no at step S53), the CPU 61 stands by until the layout of the N-th pattern is specified via the touch panel 26 (no at step S60). The user operates the touch panel 26 and specifies the layout of the N-th pattern. When the layout is specified (yes at step S60), the CPU 61 acquires the specified layout (step S61), and corrects the sewing data included in the embroidery data acquired at step S52, on the basis of the acquired layout and in accordance with a known method (refer to Japanese Laid-Open Patent Publication No. 2010-246885, for example) (step S62). After that, the CPU 61 performs processing at step S63 to be described later.

When the mode is the image mode (yes at step S53), the CPU 61 causes the LCD 15 to display a message that prompts the user to arrange a print medium P1, on which the processing pattern 96 has been printed, on the sewing object C after attaching to the carriage 42 the embroidery frame 45 that is holding the sewing object C, and to input an image capture command (step S54). The CPU 61 stands by until the image capture command is input (no at step S55). Referring to the message displayed on the LCD 15, the user causes the sewing object C to be held by the embroidery frame 45 such that the holding position of the sewing object C with respect to the embroidery frame 45 is the first position, and attaches the embroidery frame 45 to the carriage 42. As shown in the upper section of FIG. 11, the user arranges the print medium P1, on which the processing pattern 96 has been printed, on the sewing object C. After the user verifies an image of the finished embroidery of the first pattern 91 with respect to the sewing object C, using the print medium P1, the user inputs the image capture command. When the image capture command is acquired (yes at step S55), the CPU 61 causes the image sensor 35 to capture an image of a predetermined area, and thus acquires the image data generated by the image capture (step S56). The predetermined area may be determined in advance or may be specified by the user. The CPU 61 may identify the predetermined area on the basis of the embroidery data.

On the basis of the embroidery data acquired at step S52, the CPU 61 determines whether or not to perform the positioning using the marker 50 (step S57). The CPU 61 of the present example determines whether or not to perform the positioning using the marker 50, on the basis of whether or not the layout data is included in the embroidery data acquired at step S52. Specifically, when the layout data is included in the embroidery data acquired at step S52, the CPU 61 determines that the positioning of the first pattern 91 is to be performed using the marker 50 (yes at step S57). In this case, the CPU 61 processes the image data acquired at step S56, detects the marker 50 from the image, and identifies the position and angle of the detected marker 50 in the embroidery coordinate system (step S58). When the layout data is not included in the embroidery data acquired at step S52, the CPU 61 determines that the positioning is not to be performed using the marker 50 (no at step S57). In this case, the CPU 61 processes the image data acquired at step S56, detects the processing pattern from the image, and identifies the position and angle of the detected processing pattern (step S59). The processing that identifies the position and angle of the detected processing pattern is performed using known pattern matching that compares the image representing the pattern based on the embroidery data and the image represented by the image data acquired at step S56. Known image processing technologies include, for example, Oriented FAST and Rotated BRIEF (ORB), Scale Invariant Feature Transform (SIFT), Speeded-Up Robust Features (SURF) and the like. Since these algorisms are well known, a detailed explanation thereof is omitted here.

The CPU 61 corrects the sewing data included in the embroidery data acquired at step S52, in accordance with detection results at step S58 and step S59 (step S62). Specifically, when the positioning of the first pattern 91 is to be performed using the marker 50, the CPU 61 identifies the layout of the pattern with respect to the marker 50 identified at step S58, on the basis of the position and angle of the marker 50 identified at step S58 and the position and angle of the pattern with respect to the marker 50. The position and angle of the pattern with respect to the marker 50 are indicated by the layout data included in the embroidery data acquired at step S52. The CPU 61 corrects the sewing data so that the N-th pattern in the sewing order is sewn in accordance with the identified layout. Meanwhile, when the positioning is not to be performed using the marker 50, the CPU 61 corrects the sewing data so that the N-th pattern is sewn at the identified position and angle, on the basis of the position and angle of the image of the processing pattern identified at step S59. The CPU 61 causes the LCD 15 to display a message that prompts the user to input a sewing start command (step S63), and stands by until the sewing start command is acquired (no at step S64). After verifying the message on the LCD 15, the user removes the print medium arranged on the sewing object C and inputs the sewing start command. When the sewing start command is acquired (yes at step S64), the CPU 61 causes the N-th pattern to be sewn in accordance with the sewing data corrected at step S62 (step S65).

The CPU 61 determines whether or not the variable N is the last in the sewing order (step S66). The CPU 61 determines that 1, which is the variable N, is not the last in the sewing order (no at step S66), and increments the variable N by 1 (step S67). After that, the CPU 61 displays a message that prompts the user to change the holding position of the sewing object C with respect to the embroidery frame 45 (step S68). In accordance with the message displayed at step S68, the user changes the holding position of the sewing object C with respect to the embroidery frame 45 from the first position to the second position. The user attaches, to the carriage 42, the embroidery frame 45 that is holding the sewing object C whose holding position has been changed. Subsequent to the processing at step S68, the CPU 61 returns the processing to step S52.

Figure 11:
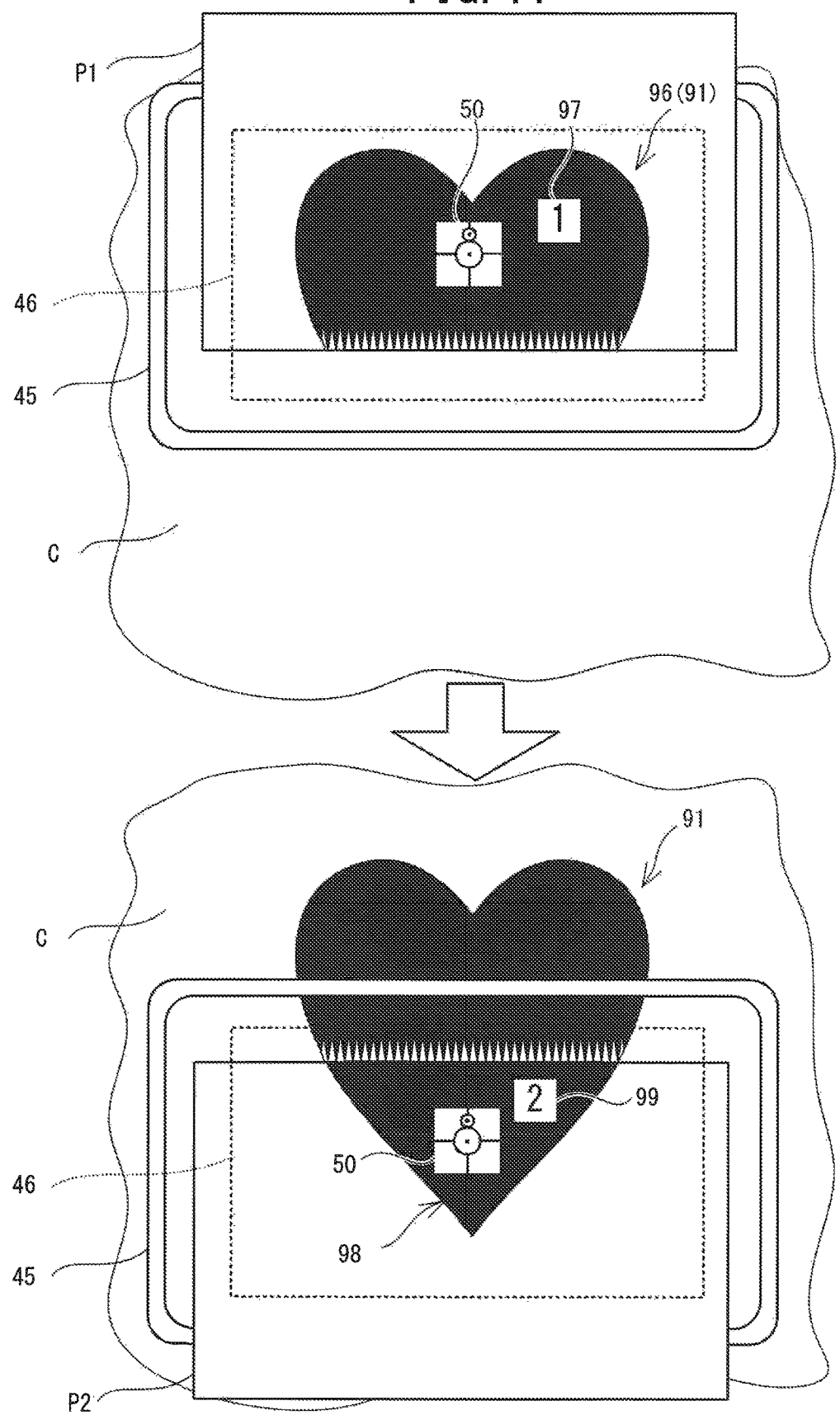
FIG. 11 is an explanatory diagram of an operation when a user specifies a layout of the first pattern 91 and a layout of the second pattern 92 using the processing patterns 96 and 98 that have been processed in accordance with the processing data.

When the variable N is 2, in accordance with the message displayed at step S54, the user arranges a print medium P2, on which the processing pattern 98 has been printed, on the sewing object C, as shown in the lower section of FIG. 11. The user adjusts the position of the print medium P2 with respect to the first pattern 91 that has already been sewn, and thus adjusts the layout of the processing pattern 98 with respect to the first pattern 91. The user verifies the layout of the processing pattern 98 with respect to the first pattern 91 by referring to the print medium P2, and thereafter inputs the image capture command. When the image capture command is acquired (yes at step S55), the CPU 61 causes the image sensor 35 to perform image capture, and acquires the image data generated by the image capture (step S56).

On the basis of the embroidery data acquired at step S52, the CPU 61 determines that the positioning is to be performed using the marker 50 (yes at step S57). The CPU 61 processes the image data acquired at step S56, detects the marker 50 from the image, and identifies the position and angle of the detected marker 50 in the embroidery coordinate system (step S58). The CPU 61 corrects the sewing data included in the embroidery data acquired at step S52, in accordance with a detection result at step S58 and the layout data of the N-th pattern (step S62). The CPU 61 causes the LCD 15 to display the message that prompts the user to input the sewing start command (step S63), and stands by until the sewing start command is acquired (no at step S64). After verifying the message on the LCD 15, the user removes the print medium P2 arranged on the sewing object C and inputs the sewing start command. When the sewing start command is acquired (yes at step S64), the CPU 61 causes the second pattern 92 to be sewn in accordance with the sewing data corrected at step S62 (step S65). Since the variable N is 2, it is determined that the variable N is the last in the sewing order (yes at step S66), and the CPU 61 ends the main processing.

The device 20 can generate the processing data representing the full-size processing pattern. The processing includes, for example, printing, drawing and cutting. The device 20 of the present example generates, as the processing data, the print data to print the processing pattern in full size on the print medium, which is the sheet-like processing object. The processing pattern 98 when the variable N is 2 is a pattern obtained by excluding the overlapping portion 94 from the second pattern 92. Therefore, as shown in the lower section of FIG. 11, the user arranges the processing pattern 98 printed on the print medium P2 on the sewing object C such that the processing pattern 98 is aligned with the already sewn first pattern 91. Thus, the user can intuitively grasp the layout of the second pattern 92 with respect to the first pattern 91.

The device 20 arranges the marker 50, which is used as a reference for the layout of the second pattern 92, with respect to the processing pattern 98, and sets the layout of the second pattern 92 represented by the sewing data with respect to the marker 50. The device 20 generates the processing data to process the full-size processing pattern 98 and the marker 50 arranged with respect to the processing pattern 98. Thus, with the device 20, it is possible to generate the processing data to process the processing pattern 98 and the marker 50, which is used as the reference for the layout of the second pattern 92. In the sewing machine 10, an image of the processing pattern 98 processed on the sewing object (the print medium P2) is captured in a state in which the processing pattern 98 is aligned with the already sewn first pattern 91. Thus, the user can cause the sewing machine 10 to perform the processing that sets the layout of the second pattern 92 with respect to the first pattern 91.

The device 20 arranges the image representing the marker 50 on the processing pattern 98 so as to overlap with the processing pattern 98. The device 20 can generate the processing data such that the image representing the marker 50 overlaps with the processing pattern 98. By joining the processing pattern 98 printed on the print medium P2 with the already sewn first pattern 91, the user can intuitively grasp the layout of the second pattern 92 with respect to the first pattern 91 without worrying about the layout of the marker 50. Even when the processing pattern is cut out along the contour, the user can make the relative position of the processing pattern with respect to the marker 50 constant. When the user sews the pattern 90 using the sewing machine 10 that can capture the image of the marker 50 and perform the positioning, the user causes the image of the processing pattern 98 that has been processed to be captured in the state in which the processing pattern 98 is aligned with the already sewn first pattern 91. By inputting the image capture command, the user can cause the sewing machine 10 to perform the processing that sets the layout of the second pattern 92 with respect to the first pattern 91. When the processing object is processed in accordance with the processing data, it is possible to reduce the printing space of the print medium P2 in comparison to when the processing pattern 98 and the marker 50 are arranged in separate areas.

The device 20 determines whether the image representing the marker 50 can be arranged on the processing pattern so as to overlap with the processing pattern. When it is determined that the image representing the marker 50 cannot be arranged on the processing pattern so as to overlap with the processing pattern, the device 20 arranges the marker 50, with respect to the processing pattern, at the predetermined position where the marker 50 does not overlap with the processing pattern. When the image representing the marker 50 cannot be arranged on the processing pattern so as to overlap with the processing pattern, the device 20 can generate the processing data such that the marker 50 is arranged at the predetermined position with respect to the processing pattern.

The device 20 acquires the size of the sewable area 46 that is set inside the embroidery frame 45 (step S11). On the basis of the acquired size of the sewable area 46, the pattern 90 acquired at step S1 is divided into the first pattern 91 and the second pattern 92 having a size that is contained within the sewable area 46 (step S14). When the pattern 90 larger than the sewable area 46 is to be sewn, the device 20 can automatically divide the pattern 90 into the partial patterns having a size that is reliably contained within the sewable area 46. The device 20 can eliminate a user operation to specify dividing positions, which is troublesome.

The CPU 1 acquires the size of the processing area (the print area) that is set on the sewing object (the print medium) (step S12). On the basis of the acquired sizes of the sewable area 46 and the processing area (the print area 47), the CPU 1 divides the pattern 90 acquired at step S1 into the first pattern 91 and the second pattern 92 having a size that is contained within both the sewable area 46 and the processing area (the print area 47) (step S14). When the printing is performed in accordance with the print data generated by the device 20, each of the processing pattern 96 of the first pattern 91 and the processing pattern 98 of the second pattern 92 is contained on a single sheet of the print medium. In comparison to when one processing pattern is divided and printed on a plurality of sheets of the print medium, the device 20 can improve user-friendliness when the user verifies the finished sewing of the pattern using the printed processing pattern.

The device 20 divides the acquired pattern into a plurality of partial patterns including the first pattern and the second pattern. The partial patters that are adjacent to each other include an overlapping portion in which they partially overlap with each other. The device 20 sets the sewing order of the plurality of partial patterns and generates the sewing data to sew each of the partial patterns. The device 20 generates the processing data to process the processing pattern excluding the overlapping portion that overlaps with the preceding partial pattern in the sewing order among the plurality of partial patterns, in full size for each of the partial patterns. With respect to the first pattern 91, the device 20 can generate the processing data to process, in full size, the processing pattern including the overlapping portion 93. With respect to the second pattern 92, the device 20 can generate the processing data to process, in full size, the processing pattern excluding the overlapping portion 94.

The device 20 generates the processing data to process the processing pattern excluding the overlapping portion that overlaps with the preceding partial pattern in the sewing order among the plurality of partial patterns, and the symbol indicating the sewing order, in full size for each of the partial patterns. When the processing object is processed in accordance with the generated processing data, the device 20 can process the processing object such that the correspondence between the sewing order and the partial patterns can be grasped. The user can easily grasp the sewing order of the partial patterns by looking at the processing object.

The device 20 sets the distance D21 between the first end portion 75 of the processing pattern 98 on the first side (the upper side of FIG. 9), which is in contact with the overlapping portion 94, and the end portion 76 on the first side of the rectangular processing area to be shorter than the distance D22. The distance D22 is the distance between the second end portion 77 of the processing pattern 98 on the second side opposite to the first side, and the end portion 78 on the second side of the processing area. Therefore, when the device 20 processes the processing object in accordance with the generated processing data, the user can easily arrange the processing object with respect to the already sewn partial pattern, in comparison to when the processing pattern is not arranged nearer to the first side with respect to the processing object. With the device 20 of the present example, the first end portion 75 is a straight line and the distance D21 is 0. Therefore, as shown in the lower section of FIG. 11, the user can easily perform positioning with respect to the sewing object C on which the first pattern 91 has been sewn, without performing processing, such as cutting the print medium P2 along the pattern.

The non-transitory computer-readable medium storing the sewing data generation program, the sewing data generation device and the sewing method of the present disclosure are not limited to the above described embodiment, and various changes may be made without departing from the spirit and scope of the present disclosure. For example, the following modifications (A) to (C) may be added as appropriate.

(A) The configuration of the device 20 may be changed as appropriate. The device 20 may be a dedicated device or may be a mobile terminal device, such as a smart phone, a tablet PC or the like. The device 20 may be provided in the sewing machine 10. As long as the sewing machine 10 is capable of embroidery sewing, it may be an industrial sewing machine or a multi-needle sewing machine.

(B) The program including the instructions to cause the main processing (refer to FIG. 3), which is performed by the device 20, to be executed may be stored in a storage device of the device 20 until the CPU 1 executes the program. Therefore, an acquisition method of the program, an acquisition route, and the device that stores the program may each be changed as appropriate. The program to be executed by the CPU 1 may be received from another device via a cable or wireless communication, and may be stored in a storage device, such as a flash memory. Examples of the other device include a PC and a server connected via a network.

(C) The respective steps of the main processing (refer to FIG. 3) performed by the device 20 are not limited to the example in which they are performed by the CPU 1, and a part or all of the steps may be performed by another electronic device (an ASIC, for example). The respective steps of the main processing may be performed through distributed processing by a plurality of electronic devices (a plurality of CPUs, for example). The respective steps of the main processing can be changed in order, omitted or added, as necessary. An aspect in which an operating system (OS) or the like operating on the device 20 performs a part or all of the main processing on the basis of a command from the CPU 1 is also included in the scope of the present disclosure. For example, the following modifications from (C-1) to (C-6) may be added to the main processing, as appropriate.

(C-1) At step S42, instead of the print data, the CPU 1 may generate the processing data to process the processing pattern in full size on a sheet-like processing object different from the sewing object C. The processing data is, for example, cutting data and drawing data that are used in a known cutting device (refer to Japanese Laid-Open Patent Publication No. 2014-124748, for example). The cutting device cuts a sheet-like processing object other than the sewing object C in accordance with the cutting data. The cutting device uses a writing tool, such as a pen, to draw on the sheet-like processing object other than the sewing object C in accordance with the drawing data. When the cutting data is used as the processing data, the CPU 1 may generate the cutting data to cut along the contour of the processing pattern. In addition to the cutting data to cut along the contour of the processing pattern, the CPU 1 may generate the cutting data to cut the line drawing of the marker arranged inside the contour of the processing pattern and to cut the symbol indicating the sewing order.

(C-2) The device 20 need not necessarily arrange the marker with respect to the processing pattern. When the marker is arranged with respect to the processing pattern, the device 20 need not necessarily arrange the marker on the processing pattern so as to overlap with the processing pattern. The device 20 may omit the processing (step S36) that determines whether or not the marker is contained within the contour of the processing pattern. In this case, the device 20 may arrange the marker at a predetermined position with respect to the processing pattern. For example, the device 20 may match the center of a minimum rectangle that encompasses the processing pattern with the center of the marker. The design and size of the marker may be changed as appropriate. The device 20 need not necessarily generate the processing data for the first pattern 91. When the processing data is generated for the first pattern 91, the device 20 may use, as the processing pattern, a pattern obtained by excluding the overlapping portion 93 from the first pattern 91. The device 20 may generate the processing data to process a plurality of processing patterns on the same processing object while taking into account the size of the processing patterns and the size of the processing area. For example, the device 20 may generate the print data to print the processing pattern 96 and the processing pattern 98 on the same print medium. While taking into account the size of the processing pattern and the size of the processing area, the device 20 may generate the processing data to process a single processing pattern on a plurality of processing objects in a dispersed manner. For example, the device 20 may generate the print data to print the left half of the processing pattern 96 and the right half of the processing pattern 96 on separate print media.

(C-3) The device 20 may divide the pattern into three or more partial patterns. When the device 20 divides the pattern into the first pattern, the second pattern and a third pattern in the sewing order, it is preferable that the processing pattern of the second pattern be a pattern obtained by excluding the overlapping portion of the second pattern and the first pattern from the second pattern. When the third pattern has overlapping portions that respectively overlap with the first pattern and the second pattern, it is preferable that the processing pattern of the third pattern be a pattern obtained by excluding, from the third pattern, the overlapping portion of the third pattern and the first pattern and the overlapping portion of the third pattern and the second pattern. When the device 20 divides the pattern into the first pattern, the second pattern and the third pattern in the sewing order, the processing pattern of the second pattern may be a pattern obtained by excluding, from the second pattern, an overlapping portion of the second pattern and the other partial patterns. The processing pattern of the third pattern may be a pattern obtained by excluding, from the third pattern, one of the overlapping portion of the third pattern and the first pattern and the overlapping portion of the third pattern and the second pattern.

(C-4) The device 20 need not necessarily divide the pattern on the basis of the size of the sewable area and the size of the processing area. The device 20 may divide the pattern on the basis of one of the size of the sewable area and the size of the processing area. When the device 20 divides the pattern into partial patterns having the same size as the sewable area, there is a case in which it becomes difficult to set the holding position of the sewing object C with respect to the embroidery frame. In consideration of this case, the device 20 may divide the pattern on the basis of an area obtained by narrowing the sewable area by an amount that is determined while taking into account a setting accuracy of the holding position of the sewing object with respect to the embroidery frame.

(C-5) When the device 20 divides the pattern into a plurality of partial patterns, the device 20 need not necessarily set the sewing order of each of the partial patterns. The method for setting the sewing order may be determined in advance. The sewing order may be specified by the user. The device 20 need not necessarily generate the data to process the symbol indicating the sewing order. The symbol indicating the sewing order is not limited to a numeric character and may be another character or graphic. The layout of the symbol indicating the sewing order with respect to the processing pattern may be changed as appropriate. For example, with respect to the symbol indicating the sewing order, the device may determine whether or not the symbol is contained within the processing pattern in a similar manner to the processing at step S36. When it is determined that the symbol is not contained within the processing pattern, the device 20 may arrange the symbol at a predetermined position with respect to the processing pattern. When it is determined that the symbol is contained within the processing pattern, the device 20 may arrange the symbol on the processing pattern. The device 20 may set the layout of the processing pattern with respect to the processing area at an arbitrary position. For example, the device 20 may set a distance D31 between the first end portion on the first side of the processing pattern, which comes into contact with the overlapping portion, and the end portion on the first side of the rectangular processing area to be shorter than a distance D32 between the second end portion of the processing pattern on the second side opposite to the first side and the end portion on the second side of the processing area. In this case, the distance D31 need not necessarily be 0. The device 20 may set the layout of the processing pattern with respect to the processing area, without taking into account the relationship between the distance D31 and the distance D32.

(C-6) In the main processing, when the printing is not performed immediately on the basis of the print data generated at step S42, the generated print data may be temporarily stored. The sewing data need not necessarily be set in advance for the pattern acquired at step S1. For example, the pattern may be a line drawing input by the user. In this case, the device 20 may generate the sewing data by converting the line drawing to a predetermined stitch (for example, a fill stitch, a satin stitch or the like).

What is claimed is:

1. A non-transitory computer-readable medium storing computer-readable instructions for sewing data generation that are executed by a processor provided in a sewing data generation device, the computer-readable instructions, when executed by the processor, instructing the processor to perform processes comprising:
    acquiring a pattern;
    dividing the acquired pattern into a first pattern and a second pattern, the second pattern including an overlapping portion that partially overlaps with the first pattern;
    generating sewing data to sew each of the first pattern and the second pattern on a sewing object; and
    generating processing data to process, in full size, a processing pattern obtained by excluding the overlapping portion from the second pattern, on a sheet-like processing object different from the sewing object.

2. The non-transitory computer-readable medium according to claim 1, wherein
    the generating of the processing data includes generating print data to print the processing pattern in full size on a print medium, which is the sheet-like processing object.

3. The non-transitory computer-readable medium according to claim 1, wherein
    the computer-readable instructions further instruct the processor to perform processes comprising:
        arranging a marker, which is used as a reference for a layout of the second pattern, with respect to the processing pattern, and
    setting the layout of the second pattern represented by the sewing data with respect to the marker, wherein
    the generating of the processing data includes generating the processing data to process the full-size processing pattern and the marker arranged with respect to the processing pattern.

4. The non-transitory computer-readable medium according to claim 3, wherein
    the setting of the layout includes arranging an image representing the marker on the processing pattern so as to overlap with the processing pattern.

5. The non-transitory computer-readable medium according to claim 4, wherein
the computer-readable instructions further instruct the processor to perform a process comprising:
determining whether the image representing the marker is able to be arranged on the processing pattern so as to overlap with the processing pattern, wherein
the setting of the layout includes arranging the marker, with respect to the processing pattern, at a predetermined position where the marker does not overlap with the processing pattern, when it is determined that the image representing the marker is not able to be arranged on the processing pattern so as to overlap with the processing pattern.

6. The non-transitory computer-readable medium according to claim 1, wherein
the computer-readable instructions further instruct the processor to perform a process comprising:
acquiring a size of a sewable area that is set inside an embroidery frame, wherein
the dividing of the pattern includes dividing the acquired pattern into the first pattern and the second pattern having a size that is contained within the sewable area, on the basis of the acquired size of the sewable area.

7. The non-transitory computer-readable medium according to claim 6, wherein
the computer-readable instructions further instruct the processor to perform a process comprising:
acquiring a size of a processing area that is set on the processing object, wherein
the dividing of the pattern includes dividing the acquired pattern into the first pattern and the second pattern having a size that is contained within both the sewable area and the processing area, on the basis of the acquired size of the sewable area and the acquired size of the processing area.

8. The non-transitory computer-readable medium according to claim 1, wherein
the dividing of the pattern includes dividing the acquired pattern into a plurality of partial patterns, the plurality of partial patterns including the first pattern and the second pattern and including the overlapping portion in which the adjacent partial patterns partially overlap with each other,
the generating of the sewing data includes setting a sewing order of the plurality of partial patterns and generating the sewing data to sew each of the plurality of partial patterns, and
the generating of the processing data includes generating the processing data to process a processing pattern obtained by excluding the overlapping portion that overlaps with the preceding partial pattern in the sewing order among the plurality of partial patterns, in full size for each of the plurality of partial patterns.

9. The non-transitory computer-readable medium according to claim 8, wherein
the generating of the processing data includes generating the processing data to process the processing pattern obtained by excluding the overlapping portion that overlaps with the preceding partial pattern in the sewing order among the plurality of partial patterns, and a symbol indicating the sewing order, in full size for each of the plurality of partial patterns.

10. The non-transitory computer-readable medium according to claim 7, wherein
the generating of the processing data includes generating the processing data in which
a distance between
a first end portion on a first side of the processing pattern and
an end portion on the first side of the processing area having a rectangular shape
is set to be shorter than
a distance between
a second end portion on a second side of the processing pattern and
an end portion on the second side of the processing area, the first side being a side in contact with the overlapping portion of the processing pattern, and
the second side being an opposite side to the first side.

11. A sewing data generation device comprising:
a processor; and
a memory storing computer-readable instructions, when executed by the processor, instructing the processor to perform processes comprising:
acquiring a pattern;
dividing the acquired pattern into a first pattern and a second pattern, the second pattern including an overlapping portion that partially overlaps with the first pattern;
generating sewing data to sew each of the first pattern and the second pattern on a sewing object; and
generating processing data to process, in full size, a processing pattern obtained by excluding the overlapping portion from the second pattern, on a sheet-like processing object different from the sewing object.

12. A sewing method comprising:
dividing a pattern into a first pattern and a second pattern;
generating sewing data to sew each of the first pattern and the second pattern on a sewing object;
sewing the first pattern on the sewing object in accordance with the generated sewing data;
generating print data to print the second pattern in full size on a print medium different from the sewing object;
printing the second pattern in full size on the print medium in accordance with the generated print data;
arranging the print medium on which the second pattern has been printed, on the sewing object on which the first pattern has been sewn;
adjusting a layout of the second pattern with respect to the first pattern sewn on the sewing object;
acquiring image data by capturing an image of the sewing object and the print medium in a state in which the print medium is arranged on the sewing object;
correcting the sewing data to sew the second pattern, on the basis of the acquired image data; and
sewing the second pattern on the sewing object on which the first pattern has been sewn in accordance with the corrected sewing data.

* * * * *